United States Patent [19]

Heiser et al.

[11] 4,423,747
[45] Jan. 3, 1984

[54] PRESSURE REGULATING VALVE

[75] Inventors: Joachim Heiser, Stuttgart; Volkmar Leutner, Friolzheim, both of Fed. Rep. of Germany

[73] Assignee: Robert Bosch GmbH, Stuttgart, Fed. Rep. of Germany

[21] Appl. No.: 283,666

[22] Filed: Jul. 15, 1981

[30] Foreign Application Priority Data

Sep. 16, 1980 [DE] Fed. Rep. of Germany ....... 3034865

[51] Int. Cl.³ .......................................... G05D 16/00
[52] U.S. Cl. .......................................... 137/85
[58] Field of Search ................... 137/85, 82, 625.64, 137/86

[56] References Cited

U.S. PATENT DOCUMENTS

| | | | |
|---|---|---|---|
| 2,965,132 | 12/1960 | Couffer | 137/625.64 |
| 3,693,916 | 9/1972 | Tritt | 137/625.64 X |
| 4,052,996 | 10/1977 | Burrus | 137/85 |
| 4,266,572 | 5/1981 | Schuttenberg | 137/625.64 X |

*Primary Examiner*—Alan Cohan
*Attorney, Agent, or Firm*—Michael J. Striker

[57] ABSTRACT

A pressure regulating valve for controlling a fluid pressure proportionally to an electric nominal value signal has a housing, a valve body in the housing, a proportionally operating magnet, a displacement pickup, a difference amplifier having inputs receiving a nominal value signal and an output signal from said displacement pickup, and an output connected with an input of the magnet, a valve cone associated with the valve body and loaded in a direction opposite to a fluid pressure as well as connected with a movable member of the displacement pickup, and a measuring spring loading the valve cone and fixedly abutting against the housing, wherein the valve member is movable in the housing and adjustable by an armature of the magnet against a force of the measuring spring.

9 Claims, 1 Drawing Figure

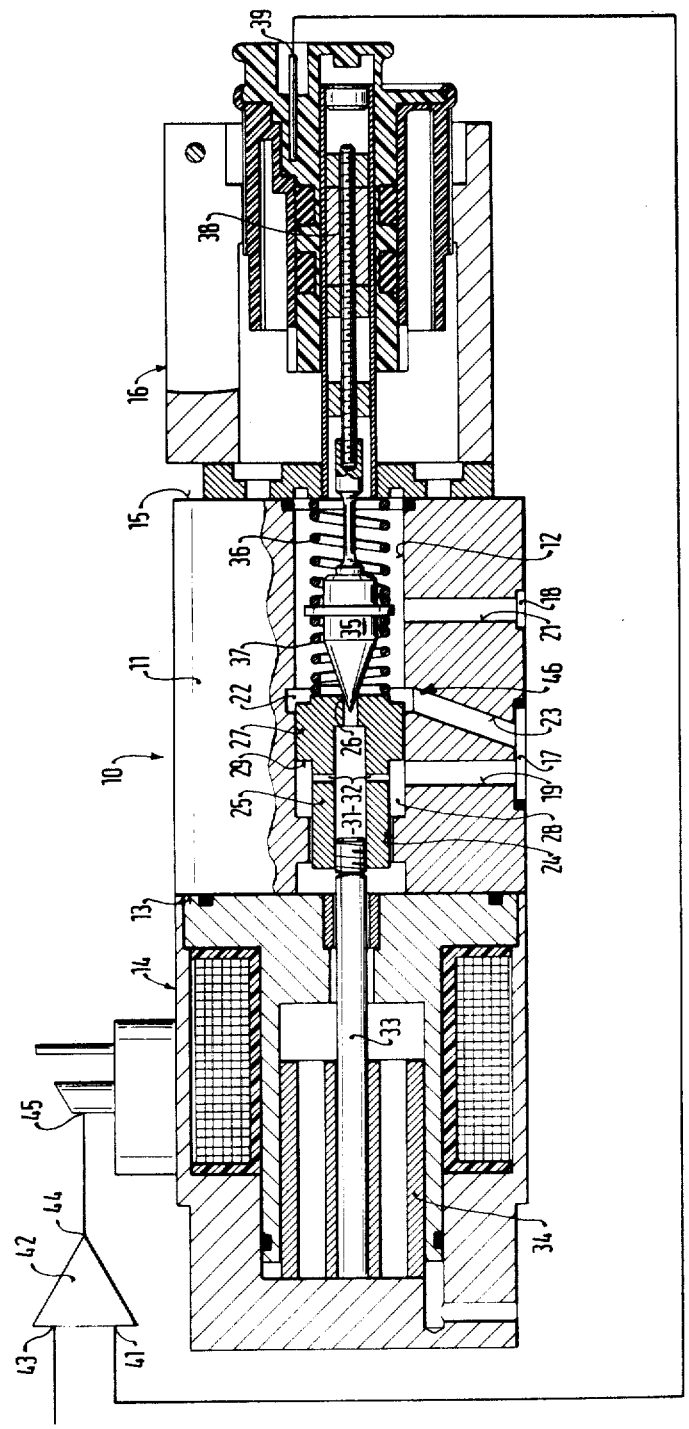

PRESSURE REGULATING VALVE

BACKGROUND OF THE INVENTION

The present invention relates to a pressure regulating valve for controlling a fluid pressure proportional to an electric nominal value signal.

Pressure regulating valves of the abovementioned general type are known in the art. One such pressure regulating valve is disclosed, for example, in the German Offenlegungsschrift No. 2,701,580. It operates with high accuracy, wherein the position of an armature is measured via an electromechanical displacement pickup and this signal after comparison with a nominal value signal produces in a difference amplifier a control signal for a proportional magnet whose armature acts via a measuring spring upon the valve cone. The abovedescribed construction has the disadvantage in the fact that a valve body associated with the valve cone is fixedly arranged in a housing. The valve cone and valve body can thereby wear after longer operational time which reduces the accuracy of the pressure regulation after this time. There is also the disadvantage in the fact that the valve is sensitive to flow variations. Furthermore, the damping in different operational conditions and during reduction of the pressure in direction to zero, encounters some difficulties in this construction. Since in this case, the armature of the proportional magnet must directly apply the closing force to the valve cone, the magnet requires a relatively great force.

SUMMARY OF THE INVENTION

Accordingly, it is an object of the present invention to provide a pressure regulating valve which avoids the disadvantages of the prior art.

More particularly, it is an object of the present invention to provide a pressure regulating valve which has a considerably improved long-term stability.

In keeping with these objects and with others which will become apparent hereinafter, one feature of the present invention resides, briefly stated, in a pressure regulating valve of the above-mentioned type in which a measuring spring is fixedly supported on a housing, a valve cone is connected with a movable member of a displacement pickup and a valve body is movably arranged inside the housing and adjustable by an armature of a magnet against the force of the measuring spring.

When the pressure regulating valve is designed in accordance with the present invention, wear of the valve cone or valve seat no longer affects the accuracy of the pressure regulation inasmuch as contrary to the known valve, the cone seat set is arranged in a forwad branch of a positioning circuit and thereby length variations due to wear and through-flow variations can be measured and corrected. The pressure regulating valve is also not sensitive to variations to the through-flow. The considerable long-term stability is further improved by the fact that a smaller number of wearing parts is located in a measuring path, whereby the pressure regulating valve is also relatively simple to assemble.

In accordance with another feature of the present invention, the valve body is provided with a valve seat, a second spring is arranged between the valve body and the valve cone and is weaker than the first-mentioned spring, a dampening throttle is arranged in a connection line between a port for controlled pressure and the valve seat, and a connection line extends from the port for controlled pressure to a port for uncontrolled pressure parallel to the dampening throttle and is controlled by the valve body. This construction provides for a good damping of the pressure regulating valve, on the one hand, and an improved reduction of pressure to zero, at the other hand. Still another feature of the present invention resides in the fact that the valve body has a differential surface which is acted upon by a pressure in the port for controlled pressure and loads the valve body against the force of the measuring spring. In such a construction the valve body can be used as a force amplifier for the magnet force. This allows to have the required magnet force relatively small, whereas the force of the measuring spring and the effective diameter of the valve cone can be selected relatively high. Thereby, the pressure regulating valve is stiffer and less inclined to vibrations.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

The single FIGURE of the drawing is a view showing a longitudinal section of a pressure regulating valve in accordance with the present invention.

DESCRIPTION OF THE PREFERRED EMBODIMENT

A pressure regulating valve in accordance with the present invention is shown in the drawing and identified in toto by reference numeral 10. The pressure regulating valve has a housing 11 with a longitudinal opening 12. A proportionally operating magnet 14 is arranged at one end side 13 of the housing 11. An induction operating electromechanical displacement pickup 16 is flanged at the opposite end side 15 of the housing 11. The housing 11 has a first port 17 for controlled pressure and a second port 18 for a return. A transverse passage 19 leads from the first port 17, and a transverse passage 21 leads from the second port 18 to the longitudinal opening 12.

An annular chamber 22 is formed in the longitudinal opening 12 in the region between the transverse passages 19 and 21. The annular chamber 22 communicates via a transverse passage 23 with the first port 17. The longitudinal opening 12 is reduced by a projection 24 in the region between the end side 13 and the annular chamber 22. A valve body 25 is sealingly and slidingly guided in the reduced portion of the longitudinal opening 12. The valve body 25 has a valve seat 26 at one end and is provided at this end with a piston portion 27. The piston portion 27 together with the projection 24 bounds an annular space 28 in the longitudinal opening 12. In this manner, a differential surface 29 is formed in the piston portion 27 of the valve body 25. Pressure in the annular space 28 acts upon the differential surface 29.

The valve body 25 is provided in its interior with an axial opening 31 which is connected with the valve seat 26. A dampening throttle 32 leads from the axial opening 31 to the annular space 28. A plug is sealingly screwed into the axial opening 31, and a plunger 33 which is fixedly connected with an armature 34 of the magnet 14 abuts against the plug. The space between the valve body 25 and the magnet is connected with the return port 18.

A valve cone 35 is further arranged in the longitudinal opening 12 in the region between the valve body 25 and the end side 15. A measuring spring 36 which loads the valve cone 35 abuts against the end side of the displacement pickup 16 and presses the valve cone 35 in direction toward the valve body 25. A second spring 37 acts opposite to the measuring spring 36. The second spring 37 abuts against the valve cone 35, on the one hand, and against the piston portion 27, on the other hand. The second spring 37 is considerably weaker than the measuring spring 36.

The delivery pickup 16 has a movable member 38 which is formed as a ferrite core. The valve cone 35 is directly mechanically connected with the movable member 38. An electric output 39 of the displacement pickup 16 is connected with an input 41 of a difference amplifier 42 which has another input 43 for a nominal value signal. An output 44 of the difference amplifier 42 is connected with an electric input 45 of the magnet 14.

The transverse passage 23 and the annular chamber 22 form parts of a connecting line 46 which leads from the port 17 to the port 18. The connecting line 46 is controlled by the piston portion 27 of the valve body 25 and extends parallel to a connecting line via the dampening throttle 32.

The operation of the pressure regulating valve 10 is as follows:

When the input 43 of the difference amplifier 42 receives the nominal value signal zero, the proportional magnet 14 is not energized. The second spring 37 which is considerably weaker than the measuring spring 36 and acts opposite to the latter, serves only to press, below the working region of the measuring spring 36, the valve body 25 and the armature 34 via the plunger 33 to the idle stroke region of the magnet 14. In this position the valve cone 35 is completely removed from the valve seat 26 in the valve body 25. Simultaneously, the piston portion 27 controls in this position the connecting line 46 from the first port 17 to the second port 18. In the first port 17 the pressure medium is accommodated whose pressure must be regulated constantly and proportionally to the magnitude of the nominal valve signal in the input 43 of the difference amplifier 42. The pressure medium stream which flows in the port 17 is limited in its magnitude upstream by a throttle or a flow regulating valve. In condition of the not energized magnet, the pressure medium stream flows approximately without pressure drop via the transverse passage 23, the annular chamber 22, the longitudinal opening 12 and the transverse passage 21 to the second port 18 and thereby to the return throttle. The operation of the dampening throttle 32 required for the stabilization of the entire system is here excluded. The pressure regulating valve 10 can thereby, in condition of a nominal value signal zero, reduce the pressure in the first port 17 to a lower magnitude as compared with the known constructions.

When now with a nominal value signal in the input 43 of the difference amplifier 42, the deepest adjustable pressure of the pressure regulating valve 10 is given there is the differing actual value signal in the input 41, thereby the magnet 14 obtains an adjusting signal in its electrical input 45 until the valve body 25 is displaced to its working position by the armature 34 to the right, as seen in the drawing. In the working position, the piston portion 27 of the valve body 25 controls the annular chamber 22. The pressure which takes place in the first port 17 can now proceed via the transverse passage 19, the annular space 28, the dampening throttle 32, the axial opening 31, the valve seat 26, to the valve cone 35 and via the longitudinal opening 12 and the transverse passage 21, to the second port 18. Thereby, the valve cone 35 with the valve seat 26 form a throttling location. A pressure difference which takes place at the throttling location acts via the actuating surface of the valve cone 35 as a pressure proportional force onto the measuring spring 36. The measuring spring 36 whose stroke corresponds to the working stroke region of the magnet 14, is subjected thereby to a pressure proportional length variation. The latter leads to a corresponding stroke variation of the ferrite core 38 in the displacement pickup 16 which is removed at the electric output 39 as a corresponding electrical signal. This displacement dependent actual value signal in the outlet 39 is compared in the difference amplifier 42 with the nominal value signal. The amplifier 42 forms from the difference of these signals a direct current signal for controlling the proportional magnet 14. The magnet 14 displaces, via the armature 34 and the plunger 33 the valve body 25 so long against the force of the measuring spring 36 to the right until the measured pressure corresponds to the nominal value.

It can be seen from the above described functioning that the relative length of the valve cone 35 to the valve body 25 plays no role in the event of the pressure measurement. The regulated pressure is determined only by the variation of the length of the measuring spring 36. A wear of the valve cone 35 or a penetration at the valve seat 26 no longer influence the accuracy of the pressure control. In such a case the armature 34 of the magnet 14 adjusts the valve 25 automatically to another position. In the same way, the variable through-flow is also not important. The valve stroke which changes in the event of a variable through-flow does not lead to another spring force, but only to another position of the valve body 25. The pressure regulating valve 10 thereby works not only stable, but also has a high long-term stability and is not sensitive to variations of the through-flow.

Moreover, the valve body 25 works as a force amplifier for the magnet force. For this purpose, the regulated pressure in the first port 17 acts in the annular space 28 upon the differential surface 29 of the piston portion 27. Thereby, in proportional dependence to the regulated pressure, the axial force increases thereby the force which is applied from the armature 34 to the valve body 25 in operational direction. In dependence upon the dimension of the differential surface 29, a force amplification of the magnet 14 takes place. In this construction, the effective diameter of the valve cone 35 and the force of the measuring spring 36 can be great in condition of a relatively small magnet force. Because of such a construction, the pressure regulating valve 10 is stiffer and less inclined to vibrations.

Since the valve cone 35 is formed as a pressure receiving element in connection with a valve member 25 which is axially adjustable by a proportional magnet, a particularly advantageous pressure regulating valve is formed wherein the valve body 25 performs during its axial stroke several functions. Particularly, the closing force can vary in a regulated manner, control the connection line 46 and thereby acts as a force amplifier for the magnet force. The pressure regulating valve 10 thereby provides for a plurality of advantages, namely as follows: It is characterized by a well dampening, has a high long-term stability, is not sensitive to variation of the throughflow, designed with a relatively smaller magnet force, allows an active pressure reduction in zero position, and has a smaller number of wearing parts in a measuring path. The pressure regulating valve 10 thereby provides for an especially advantageous combination of features.

It will be understood that each of the elements described above, or two or more together, may also find a useful application in other types of constructions differing from the types described above.

While the invention has been illustrated and described as embodied in a pressure regulating valve it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure regulating valve for controlling a fluid pressure proportionally to an electrical nominal valve signal, comprising a housing; a valve body in said housing; a proportionally operating magnet having an armature and an electric input; a displacement pick-up having a movable member; a difference amplifier having inputs receiving a nominal value signal and an output signal from said displacement pick-up, and an output connected with said input of said magnet; a valve cone associated with said valve body and loaded in a direction opposite to a fluid pressure which is connected to an inlet in the valve housing and is controlled via variable flow path means defined by the valve body and the loaded valve cone, said valve cone being connected with said movable member of said displacement pick-up; and a measuring spring loading said valve cone and fixedly abutting said housing, said valve body being movable in said housing and adjustable by said armature of said magnet against the force of said measuring spring.

2. A pressure regulating valve as defined in claim 1, wherein the valve body and the valve housing define additional path means parallel to said variable flow path means.

3. A pressure regulating valve as defined in claim 2, wherein said valve body is formed with a valve seat; and further comprising a second spring arranged between said valve body and said valve cone and being weaker than said first-mentioned spring, a port in said housing for a controlled pressure, a connection line extending from said port for controlled pressure to said valve seat, a dampening throttle arranged in said connection line from said port for controlled pressure to said valve seat, a port in said housing for an uncontrolled pressure, and a connection line extending from said port for controlled pressure to said port for uncontrolled pressure parallel to said dampening throttle and controlled by said valve body.

4. A pressure regulating valve as defined in claim 3, wherein said valve body has a differential surface which is acted upon by a pressure in said port for controlled pressure and loads said valve body against the force of said measuring spring.

5. A pressure regulating valve as defined in claim 3, wherein said housing has a longitudinal opening, said valve body being guided in said longitudinal opening and having an inner opening connected with said valve seat, said dampening throttle being open into said inner opening of said valve body.

6. A pressure regulating valve as defined in claim 5, wherein said valve body has an end with said valve seat and is provided at said end with a piston portion which forms said differential surface and controls said connection line extending from said port for controlled pressure to said port for uncontrolled pressure parallel to said dampening throttle.

7. A pressure regulating valve as defined in claim 3, wherein said second spring is arranged so as to urge said valve body when said magnet is not energized, to an idle stroke region of said magnet in an inoperative position in which said connection line from said port for uncontrolled pressure to said port for controlled pressure is controlled.

8. A pressure regulating valve as defined in claim 1, wherein said valve body and said armature of said magnet, and said valve cone and said movable member of said displacement pickup are in direct mechanical operative connection with one another, respectively.

9. A pressure regulating valve as defined in claim 3, wherein said housing has opposite end sides and an opening, said magnet and said displacement pickup being arranged at said opposite end sides of said housing, and said valve body and said valve cone with both said springs being arranged in said opening of said housing.

* * * * *